United States Patent Office 3,239,542
Patented Mar. 8, 1966

3,239,542
19 NOR-Δ²-ANDROSTENE-17β-OL AND THE
ESTERS THEREOF
Albert Bowers, John Edwards, and James C. Orr, all of Mexico City, Mexico, assignors, by mesne assignments, to Syntex Corporation, a corporation of Panama
No Drawing. Filed Aug. 1, 1961, Ser. No. 128,361
Claims priority, application Mexico, Feb. 7, 1961, 61,504, 61,505
17 Claims. (Cl. 260—397.5)

The present invention relates to a new method for preparing certain cyclopentanophenanthrene derivatives and to the use of the same as anabolic agents.

More particularly, it relates to a new method for preparing Δ²-androsten-17β-ol as well as the novel 19-nor-Δ²-androsten-17β-ol, the 17α-aliphatic hydrocarbon derivatives thereof as well as the esters of such compounds.

The surprising discovery has been made that these compounds are potent anabolic agents having a very small androgenic activity; furthermore, they possess anti-estrogenic activity, lower the chloesterol level in the blood and inhibit the excretion of gonadotropins by the pituitary gland. The 17α-alkenyl and 17α-alkynyl compounds further possess progestational activity.

The anabolic-androgenic activity of these compounds has been measured, for example, in young male castrated rats, administering the compound by injection and measuring the response of such treatment by the increase in weight of the ventral prostate, seminal vesicles and the levatory anus muscle. The results of these tests indicate that these compounds possess a very small androgenic activity, whereas the anabolic activity is much higher than the anabolic activity of testosterone.

Taking into account the biological activity of Δ²-androsten-17β-ol, of its esters as well as of the corresponding 19-nor-derivatives, there have been found many indications for the use of such compounds in human therapy. The main applications in medical practice are those cases of patients with weakening diseases where it is necessary to increase the protein metabolism, a positive balance of nitrogen and a larger deposition of calcium in the bone tissue. Within this field of application fall all of the cases of deficient nutrition or growth, metastasic cancer, caquectizing chronic diseases, osteoporosis and post-operatory handling of different surgery indications, as well as other diseases which produce a negative nitrogen balance.

The therapeutic dose for these compounds varies between 2 and 10 mg. per day, according to the age and the pathological state of the patient.

The novel compounds are administered by injection: Δ²-androsten-17β-ol and its 19-nor derivative in microcrystalline suspension and their esters in oil solution, preferably using sesame oil as vehicle.

When a prolonged action is desired, there may be advantageously administered a mixture of esters derived from carboxylic acids of 1 to 12 carbon atoms, of different chain length, such as for example a mixture of the acetate and undecenoate of Δ²-androsten-17β-ol in oil solution. A single injection of such preparation is sufficient to produce the same action of several injections of the free compound or of a single ester administered daily for several weeks; however, the required doses are generally higher than those indicated previously.

The method for preparing Δ²-androsten-17β-ol, its esters and the derivatives lacking the angular methyl group at C–10 is illustrated by the following sequence of reactions:

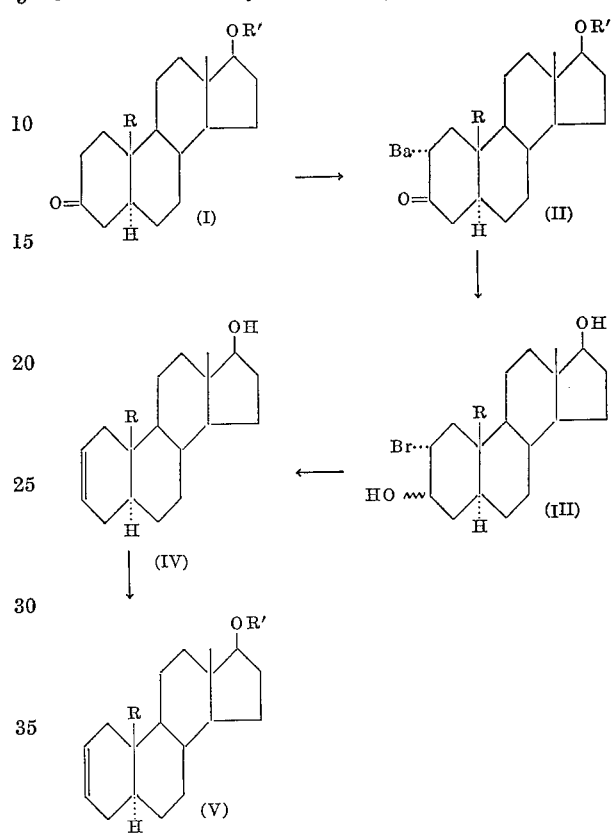

In the above formula, R represents hydrogen or methyl; R¹ represents hydrogen or an acyl radical derived from a carboxylic acid of 1 to 12 carbon atoms, saturated or unsaturated, of straight, branched, cyclic, mixed aliphatic-cyclic or aromatic chain, which may further be substituted with functional groups such as hydroxy, alkoxy, nitro, amino or halogen. Typical such esters are the acetate, propionate, caproate, enanthate, undecenoate, benzoate, trimethylacetate, t-butylacetate, phenoxyacetate, cyclopentylpropionate, aminoacetate and β-chloropropionate.

Upon treatment of dihydroallotestosterone or an ester thereof (I), preferably the acetate with one molar equivalent of bromine in glacial acetic solution, at a temperature between 15 and 20° C., there is afforded a 2α-bromo-androstan-17β-ol-3-one or its esters (II; R=methyl). The 2-bromo derivative is then reduced with a double metal hydride, such as sodium borohydride, in a solvent inert to this reaction, preferably methanol or dioxane, for a period of time between 5 and 18 hours, to produce a mixture of 2α-bromo-androstane-3β,17β-diol and 2α-bromo-androstane-3α,17β-diol (III; R=methyl), with simultaneous hydrolysis of the 17-acyloxy group when the starting material employed is an ester of dihydroallotestosterone.

By heating at 89–90° C., the mixture of epimeric bromo hydrins with zinc dust in acetic acid, with stirring, for a period of time of approximately one hour, there is obtained Δ²-androsten-17β-ol (IV; R=methyl).

In a similar manner, the process set forth above is applied to 19-nor-dihydrotestosterone or its esters; thus, by bromination of 19-nor-dihydroallotestosterone or an ester thereof with one molar equivalent of bromine there is obtained the 2α-bromo derivative (II; R=hydrogen), which on reduction with sodium borohydride in dioxane or methanol yields a mixture of the epimeric bromohydrins (III; R=hydrogen). The treatment of the above mixture of bromohydrins with zinc dust in acetic acid then produces 19-nor-Δ²-androsten-17β-ol (IV; R=hydrogen).

By reacting Δ²-androsten-17β-ol or the 19-nor derivative thereof with anhydrides or chlorides of carboxylic acids of less than 12 carbon atoms, in pyridine solution, by conventional methods, there are obtained the correspending esters.

As has been set forth above, both Δ²-androsten-17β-ol as well as its esters and the corresponding 19-nor-analogs are potent anabolic agents having a very small androgenic activity.

The novel compounds of the present invention containing a 17α-aliphatic hydrocarbon group are represented by the following formula:

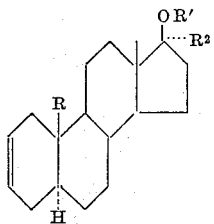

In the above formula, R and R¹ have the same meaning as described previously; R² represents a lower alkyl group, that is an alkyl group of less than 8 carbon atoms such as methyl, ethyl, propyl or butyl; a lower alkenyl group, that is, an alkenyl group of 2 to 6 carbon atoms such as vinyl, propenyl-(1), or butenyl-(1), or a lower alkynyl group of 2 to 6 carbon atoms such as ethynyl, propynl or butynyl-(1).

In accordance with the invention, by treatment of Δ²-androsten-17-one or its 19-nor derivative with an alkyl, alkenyl or alkynyl magnesium halide such as methyl, ethyl, propyl, vinyl, ethynyl or propargyl magnesium bromide, there are obtained the corresponding 17α-alkyl, alkenyl or alkynyl derivatives of Δ²-androsten-17β-ol and of 19-nor-Δ²-androston-17β-ol.

Alternatively, the 17α-alkynyl substituted derivatives may be obtained by treatment of Δ²-androsten-17-one or 19-nor-Δ²-androsten-17-one with sodium acetylide or potassium acetylide, or with the sodium or potassium salt of another lower alkine such as propine.

The 17α-alkenyl substituted derivatives may also be obtained from the 17α-alkynyl compounds by catalytic hydrogenation.

The novel compounds of the present invention containing the 17α-substituent are prepared by a process illustrated by the following equation:

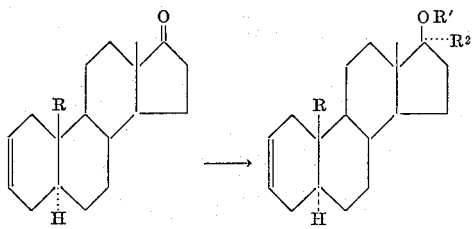

In the above formulas, R, R¹ and R² have the same meaning as set forth above.

In practicing the process outlined above, Δ²-androsten-17-one, described by Iriarte et al. in J. Org. Chem., 20, 542 (1955), is dissolved in an aromatic hydrocarbon such as benzene, toluene or xylene, or any other inert organic solvent such as ether or tetrahydrofuran, and treated with a Grignard reagent at the reflux temperature for a period of time fluctuating between 3 and 18 hours, or at room temperature for 15 to 24 hours, under anhydrous conditions, to convert the 17-keto group into the 17β-hydroxy-17α-alkyl, 17β-hydroxy-17α-alkenyl or 17β-hydroxy-17α-alkynyl grouping, according to the organometallic halide employed for the reaction. Thus, by reaction with methyl magnesium bromide, there is obtained 17α-methyl-Δ²-androsten-17β-ol, and by similar reaction with an ethyl, propyl, vinyl, ethinyl or propargyl magnesium halide, or any other Grignard reagent, there are produced the respective 17α-substituted Δ²-androsten-17β-ol derivatives.

As has been set forth above, the 17α-alkynyl-17β-hydroxy-Δ²-androstenes may also be obtained by treating a benzene solution of Δ²-androsten-17-one with sodium or potassium acetylide or with the sodium or potassium salt of any other alkyne. By partial hydrogenation of the 17α-alkynyl-Δ²-androsten-17β-hydroxy compounds, in the presence of a palladium catalyst, such as palladium on calcium carbonate, and using an amine as solvent, preferably pyridine, there are obtained the corresponding 17α-alkenyl derivatives.

By applying the process set forth above, to 19-nor-Δ²-androsten-17-one, which is in turn obtained by oxidation of 19-nor-Δ²-androsten-17β-ol, there are obtained the corresponding 17α-substituted derivatives lacking the angular methyl group at C–10. Thus, by treatment of 19-nor-Δ²-androsten-17-one with a Grignard reagent of the type set forth above, there are obtained the respective 17α-alkyl, 17α-alkenyl, and 17α-alkynyl derivatives of 19-nor-Δ²-androsten-17β-ol.

Similarly, the 17α-alkynyl-19-nor-Δ²-androsten-17β-hydroxy-derivatives may be obtained by treatment of 19-nor-Δ²-androsten-17-one with sodium or potassium acetylide, or with sodium or potassium salt of another alkyne, such as has been described for the compounds possessing an angular methyl group at C–10, and the 17α-alkenyl-17β-hydroxy-19-nor-androstenes may be obtained by catalytic hydrogenation of the respective 17α-alkynyl derivatives.

By reacting the 17α-alkyl, 17α-alkenyl or 17α-alkynyl derivatives of Δ²-androsten-17β-ol and the corresponding 19-nor derivatives with the anhydride or chloride derived from a carboxylic acid of 1 to 12 carbon atoms, in benzene solution and in the presence of p-toluenesulfonic acid, there are obtained the esters of such compounds.

The following examples serve to illustrate but are not intended to limit the scope of the present invention:

*Example I*

A solution of 5 g. of the acetate of dihydroallotestosterone in 100 cc. of acetic acid was treated dropwise under stirring at a temperature between 15 and 20° C. with a solution of 2.5 g. of bromine (1.1 molar equivalents) in 50 cc. of acetic acid. The solution was stirred until it decolorized completely, then poured into ice cold salt solution and the precipitate formed was collected by filtration, washed with water to neutral, dried and recrystallized from acetone-hexane, thus yielding 3.9 g. of the acetate of 2α-bromodihydroallotestosterone. To a solution of 3 g. of the above compound in 50 cc. of dioxane was added at room temperature a solution of 3 g. of sodium borohydride in 10 cc. of water and the mixture was kept standing overnight at room temperature; the excess of reagent was decomposed by the addition of 0.5 cc. of acetic acid and the solution was concentrated to a small volume under vacuum; after pouring into water the product was extracted with several portions of ethyl acetate and the extract was washed with water to neutral, dried over anhydrous sodium sulfate and evaporated to dryness, thus furnishing a mixture of 2α-bromo-androstane-3β,17β-diol and 2α-bromo-androstane-3α,17β-diol, which was purified by chromatography on washed alumina.

A mixture of 2 g. of the above crude bromohydrin and 50 cc. of acetic acid was treated with 2 g. of zinc dust and then stirred for one hour at 90° C. (steam bath). The zinc was removed by filtration through celite and the filtrate was diluted with water; the precipitate formed was collected, well washed with water to neutral and dried under vacuum. Recrystallization from acetone-hexane afforded 1.1 g. of $\Delta^2$-androsten-17β-ol.

*Example II*

A solution of 1 g. of $\Delta^2$-androsten-17β-ol in 4 cc. of pyridine and 2 cc. of propionic anhydride was kept overnight at room temperature, then poured into water and the precipitate formed was collected and recrystallized from acetone-ether, thus giving the propionate of $\Delta^2$-androsten-17β-ol.

*Example III*

By the same method of esterification described in the preceding example, but using acetic, valeric, caproic, undecenoic and cyclopentylpropionic anhydrides as esterifying agents, there were obtained the acetate, valerate, caproate, undecenoate and cyclopentylpropionate of $\Delta^2$-androsten-17β-ol.

*Example IV*

The method of Example I was repeated, but using this time the free dihydroallotestosterone, thus obtaining successively 2α-bromoandrostan-17β-ol-3-one, 2α-bromo-androstane-3,17β-diol and $\Delta^2$-androsten-17β-ol, identical with the product obtained in such example.

*Example V*

By following the method of Example I, but using as starting material the acetate of 19-nor-dihydroallotestosterone, there were obtained 2α-bromo-19-nor-androstane-3,17β-diol and 19-nor-$\Delta^2$-androsten-17β-ol.

A mixture of 1 g. of the above compound, 5 cc. of pyridine and 2 cc. of acetic anhydride was heated for 1 hour on the steam bath, poured into water and the precipitate formed was collected, thus yielding the acetate of 19-nor-$\Delta^2$-androsten-17β-ol.

*Example VI*

A solution of 500 mg. of 19-nor-$\Delta^2$-androsten-17β-ol in 2.5 cc. of pyridine was treated with 1 cc. of benzoyl chloride and the mixture was heated for 1 hour on the steam bath; after pouring into water, the precipitate formed was collected and washed with water, thus giving the benzoate of 19-nor-$\Delta^2$-androsten-17β-ol.

*Example VII*

Pharmaceutical composition containing the propionate of $\Delta^2$-androsten-17β-ol in the form of injectable oil solution:

| 1 cc. contains: | Mg. |
|---|---|
| $\Delta^2$-androsten-17β-ol-propionate | 25.0 |
| Propyl-p-hydroxybenzoate (propyl-paraben U.S.P.) | 1.0 |
| Benzyl alcohol | 104.3 |
| Sesame oil | 805.0 |

Preparation: Place carefully weighed $\Delta^2$-androsten-17β-ol and the propyl-paraben in an adequate container which can be hermetically closed. Add the benzyl alcohol and the sesame oil, sending down the solid particles sticking to the sides of the container. Close hermetically and heat under stirring at 80–90° C. until all dissolves. Cool to 40–50° C. and filter through a Hormon "EOP" ultrafilter (Selas cells of XFF porosity may also be employed). Seal with neoprene stoppers and sterilize at 125° C. in a dry heat oven for 12 hours. Aseptically transfer to adequate containers according to the required doses. Finally sterilize these containers at 125° C. for 12 hours for ampoule bottles, and for 2 hours for ampoules.

The administration of this composition by injection produces a favorable anabolic effect, whereas the androgenic activity is very small.

*Example VIII*

Pharmaceutical composition containing $\Delta^2$-androsten-17β-ol in the form of injectable suspension:

| Formula for 1000 cc. of suspension: | Grams |
|---|---|
| $\Delta^2$-androsten-17β-ol | 5.250 |
| Sodium carboxymethyl cellulose | 5.000 |
| Sodium chloride | 9.000 |
| Methyl cellulose | 1.000 |
| Sorbitan mono-oleate polyoxyethylene (Tween 80, U.S.P.) | 1.900 |
| Methyl p-hydroxybenzoate | 2.400 |
| Propyl p-hydroxybenzoate | 0.260 |
| Distilled water | 968.400 |

*Preparation.*—A solution was obtained by dissolving sodium chloride, methyl p-hydroxybenzoate and propyl p-hydroxybenzoate in the distilled water, which was then sterilized by filtration. 200 g. of such solution were used to dissolve the methyl cellulose and the sodium carboxymethyl cellulose (solution B).

Solution B was transferred to a ball mill, the carefully weighed $\Delta^2$-androsten-17β-ol was added and the mixture sterilized for 1½ hours in an autoclave at 120° C.; after cooling, the Tween 80 was added. The sterile mixture thus obtained was stirred (rotary stirring) for 48 hours at room temperature and the resulting suspension was quantitatively transferred to a sterile container, then diluting with the rest of solution A (also sterile) and adjusting the pH to 6.8. Finally it was transferred to 1 cc. ampoules under aseptic conditions. Each cubic centimeter of this injectable suspension contains approximately 5 mg. of $\Delta^2$-androsten-17β-ol.

The administration of this injectable suspension produces a favorable protein balance, whereas the androgenic action is very small.

*Example IX*

Pharmaceutical composition containing a mixture of esters of $\Delta^2$-androsten-17β-ol in the form of injectable oil solution:

| 1 cc. contains: | Mg. |
|---|---|
| Acetate of $\Delta^2$-androsten-17β-ol | 20 |
| Valerate of $\Delta^2$-androsten-17β-ol | 40 |
| Undecenoate of $\Delta^2$-androsten-17β-ol | 120 |
| Propyl-paraben U.S.P. | 1.0 |
| Benzyl alcohol | 110 |
| Sesame oil | 775 |

The method of preparation is the same as described in Example VII.

The administration of a single dose of this composition produces a nitrogen retention for several weeks.

*Example X*

A solution of 5 g. of $\Delta^2$-androsten-17-one in 100 cc. of anhydrous benzene free of thiophene was slowly added to 25 cc. of a 4 N solution of methyl magnesium bromide in ether and the mixture was refluxed under anhydrous conditions for 3 hours, cooled, cautiously poured into water and acidified with hydrochloric acid; the benzene layer was separated and the aqueous phase was extracted several times with ethyl acetate; the organic extracts were combined with the benzene solution and then washed to neutral, dried over anhydrous sodium sulfate and evaporated to dryness under reduced pressure. By crystallization from acetone-hexane, there was obtained 17α-methyl-Δ²-androsten 17β-ol.

A mixture of 1 g. of the above compound, 40 cc. of acetic acid, 20 cc. of acetic anhydride and 1 g. of p-toluenesulfonic acid was kept at room temperature for 1 hour and then poured into water; after heating for 30 minutes on the steam bath to hydrolyze the excess of reagent the precipitate formed was collected and washed with water to neutral, thus affording the acetate of 17α-methyl-Δ²-androsten-17β-ol.

*Example XI*

By following the method of the preceding example, but using ethyl magnesium bromide and propyl magnesium bromide instead of methyl magnesium bromide as alkylating agents, the Δ²-androsten-17-one was respectively converted into 17α-ethyl-Δ²-androsten-17β-ol and 17α-propyl-Δ²-androsten-17β-ol. The subsequent acetylation of these compounds with a mixture of acetic acid and acetic anhydride and in the presence of p-toluenesulfonic acid yielded the corresponding acetates.

*Example XII*

A solution of Δ²-androsten-17-one in 100 cc. of anhydrous ether was added dropwise to a solution of propargyl magnesium bromide (prepared from 6.8 g. of propargyl bromide, 1.4 g. of magnesium and 200 cc. of ether). The mixture was refluxed with stirring overnight, and then cooled and poured into 500 cc. of a 5% solution of ammonium chloride; the ether layer was separated and washed to neutral with water, dried over anhydrous sodium sulfate and evaporated to dryness under vacuum. Crystallization of the residue from methanol furnished 17α-propargyl-Δ²-androsten-17β-ol.

A solution of 1 g. of the above compound in 20 cc. of benzene was mixed with 2 cc. of propionic anhydride and 0.5 g. of p-toluenesulfonic acid and kept overnight at room temperature. The mixture was then diluted with water and stirred for 30 minutes in order to hydrolyze the excess of reagent; the benzene layer was separated, washed with 5% sodium carbonate solution and finally with water to neutral, dried over anhydrous sodium sulfate and evaporated to dryness under vacuum. Chromatography of the residue on washed alumina followed by crystallization of the solid fractions from acetone-hexane afforded the propionate of 17α-propargyl-Δ²-androsten-17β-ol.

*Example XIII*

A stirred solution of 10 g. of 19-nor-Δ²-androsten-17β-ol, obtained in Example V, in 100 cc. of acetic acid was treated dropwise with a solution of 2.62 g. of chromic acid (1.1 equivalents) in 25 cc. of 80% acetic acid, at a temperature between 15 and 20° C. The mixture was kept standing for 1 hour at room temperature, poured into ice cold salt solution and the precipitate formed was collected by filtration and washed with water to neutral, thus yielding 19-nor-Δ²-androsten-17-one, which was purified by crystallization from chloroform-methanol.

5 g. of the above compound was treated with methyl magnesium bromide, in accordance with the method of Example X, to produce 17α-methyl-19-nor-Δ²-androsten-17β-ol.

*Example XIV*

By following the method of Example X, but using ethyl, vinyl, ethinyl or propargyl magnesium bromide, 19-nor-Δ²-androsten-17-one was respectively converted into 17α-ethyl-19-nor-Δ²-androsten-17β-ol, 17α-vinyl-19-nor-Δ²-androsten-17β-ol, 17α-ethinyl-Δ²-androsten-17β-ol, and 17α-propargyl-19-nor-Δ²-androsten-17β-ol.

*Example XV*

A solution of 2 g. of Δ²-androsten-17-one in 60 cc. of anhydrous benzene was added under an atmosphere of nitrogen to a solution of potassium t-amylate previously prepared from 1.4 g. of potassium and 30 cc. of t-amyl alcohol. A slow stream of purified acetylene was introduced into the resulting mixture for 40 hours and the solution was then poured into ice water and extracted several times with benzene. The combined extract was washed to neutral and the organic solution was dried over anhydrous sodium sulfate and evaporated to dryness under vacuum. The residue was chromatographed on 50 times its weight of washed alumina and the crystalline fractions were recrystallized from acetone-hexane, thus yielding 17α-ethinyl-Δ²-androsten-17β-ol.

By following the method of esterification of Example X, there was obtained the respective acetate.

*Example XVI*

A solution of 2 g. of 17α-ethinyl-Δ²-androsten-17β-ol in 50 cc. of pyridine was hydrogenated at room temperature and atmospheric pressure in the presence of 0.6 g. of 5% palladium on calcium carbonate catalyst (which had been previously reduced). When 1 molar equivalent of hydrogen had been absorbed the catalyst was removed by filtration and the filtrate was evaporated to dryness under vacuum. The residue was dissolved in ethyl acetate, washed with hydrochloric acid to completely remove the pyridine and finally with water to neutral, dried and concentrated to a small volume. Crystallization from ethyl acetate-hexane afforded 17α-vinyl-Δ²-androsten-17β-ol.

A mixture of 500 mg. of the above compound, 25 cc. of benzene, 2 cc. of cyclopentylpropionic anhydride and 250 mg. of p-toluenesulfonic acid was kept standing at room temperature for 48 hours, diluted with water, stirred for 30 minutes to hydrolyze the excess of reagent and the benzene layer was separated, washed to neutral, dried over anhydrous sodium sulfate and evaporated to dryness. By crystallization of the residue from acetone-ether, there was obtained the cyclopentylpropionate of 17α-vinyl-Δ²-androsten-17β-ol.

*Example XVII*

By following the method of hydrogenation described in the preceding example, 500 mg. of the propionate of 17α-propargyl-Δ²-androsten-17β-ol was converted into 17α-propenyl-Δ²-androsten-17β-ol propionate.

*Example XVIII*

In accordance with the method of esterification described in Example XII, 1 g. of 17α-methyl-19-nor-Δ²-androsten-17β-ol was converted into the corresponding propionate.

In a similar manner, but using acetic, caproic and undecenoic anhydrides as esterifying agents, there were obtained the acetate, caproate and undecenoate of 17α-methyl-19-nor-Δ²-androsten-17β-ol.

We claim:

1. A process for the preparation of a compound selected from the group consisting of Δ²-androsten-17β-ol and 19-nor-Δ²-androsten-17β-ol comprising reacting a compound of the following formula:

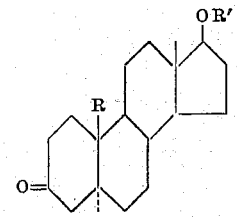

wherein R is selected from the group consisting of hydrogen and methyl; and R¹ is selected from the group consisting of hydrogen and a hydrocarbon carboxylic acyl group of less than 12 carbon atoms with one molar equivalent of bromine, reducing the thus formed 2α-bromo compound with a double metal hydride and reacting the thus formed 2α-bromo-3,17β-diol with zinc dust.

2. A compound of the following formula:

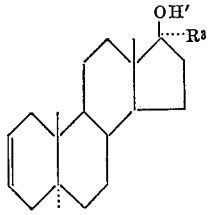

wherein $R^1$ is selected from the group consisting of hydrogen and a hydrocarbon carboxylic acyl group of less than 12 carbon atoms and $R^3$ is selected from the group consisting of hydrogen, lower alkyl, lower alkenyl and lower alkynyl.

3. 19-nor-$\Delta^2$-androsten-17β-ol.
4. The acetate of 19-nor-$\Delta^2$-androsten-17β-ol.
5. The benzoate of 19-nor-$\Delta^2$-androsten-17β-ol.
6. 17α-methyl-19-nor-$\Delta^2$-androsten-17β-ol.
7. 17α-vinyl-19-nor-$\Delta^2$-androsten-17β-ol.
8. 17α-ethinyl-19-nor-$\Delta^2$-androsten-17β-ol.
9. 17α-propargyl-19-nor-$\Delta^2$-androsten-17β-ol.

10. A compound of the following formula:

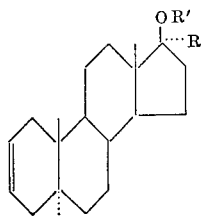

wherein $R^1$ is a hydrocarbon carboxylic acyl group of less than 12 carbon atoms and R is selected from the group consisting of lower alkyl, lower alkenyl and lower alkynyl.

11. The hydrocarbon carboxylic acid esters of less than 12 carbon atoms of $\Delta^2$-androsten-17β-ol.
12. The propionate of $\Delta^2$-androsten-17β-ol.
13. The valerate of $\Delta^2$-androsten-17β-ol.
14. The undecenoate of $\Delta^2$-androsten-17β-ol.
15. The cyclopentylpropionate of $\Delta^2$-androsten-17β-ol.
16. 17α-ethyl-$\Delta^2$-androsten-17β-ol-acetate.
17. 17α-ethinyl-$\Delta^2$-androsten-17β-ol acetate.

No references cited.

LEWIS GOTTS, *Primary Examiner.*

MORRIS LIEBMAN, *Examiner.*